Sept. 2, 1958 R. J. LA MANNA 2,850,719

DATA ENTERING MEANS FOR STORAGE DEVICES

Filed June 16, 1953 3 Sheets-Sheet 1

INVENTOR
RICHARD J. LAMANNA
BY
William L Glover
AGENT

DATA ENTERING MEANS FOR STORAGE DEVICES

Filed June 16, 1953 3 Sheets-Sheet 2

INVENTOR
RICHARD J. LAMANNA
BY William L. Glover
AGENT

Sept. 2, 1958 R. J. LA MANNA 2,850,719

DATA ENTERING MEANS FOR STORAGE DEVICES

Filed June 16, 1953 3 Sheets-Sheet 3

INVENTOR
RICHARD J. LAMANNA
BY William L. Glover
AGENT

United States Patent Office 2,850,719

Patented Sept. 2, 1958

2,850,719

DATA ENTERING MEANS FOR STORAGE DEVICES

Richard J. LaManna, Orange, N. J., assignor to Monroe Calculating Machine Company, Orange, N. J., a corporation of Delaware Application June 16, 1953, Serial No. 361,963

9 Claims. (Cl. 340—173)

This invention relates to new and useful improvements in electronic, digital computers, and more particularly to improved means for entering data into storage devices.

Various means for, and methods of entering data into electronic digital computers have been devised. Some computers are provided with a manually operated keyboard, others, with one or more magnetic tape readers, and still others, with devices for interpreting perforation patterns in tape or cards, etc. The means of the invention are concerned chiefly with manually operable keyboard input means although many, if not all, of the features thereof are applicable to input systems involving tape or cards, etc.

A known electronic digital computer is provided with a ten-key keyboard which includes, in addition to the usual digital keys, one or more multiposition switches, or a separate group of keys, whose purpose it is to channel data from the keyboard to a selected location or address in the computer storage device. The operator of this keyboard first sets the said switches, or operates the said separate group of keys to select a storage location for an item of data, and then operates the appropriate digital keys to enter said item into said storage location. Obviously, the speed at which data can be entered into this computer is severely limited by the time an operator loses in switching back and forth between the digital keys and the storage location keys or switches.

The principal object of the invention, therefore, is to provide means whereby the digital keys of a keyboard such as that described, may also be utilized as storage location selectors, thereby to facilitate the entry of data into a storage device and to increase the rate at which said entries can be made.

According to the invention, each item of data to be entered into the storage device is provided with one or more prefix digits which identify the channel, or storage location, in which the associated item is to be stored in the storage device. The prefix digits are entered into a storage location selector through the medium of the same keyboard digit keys which are subsequently used to enter the associated item. In the storage location selector, the prefix digits serve to effect differential operations of a circuit which is used to channel data items entered through the keyboard into the desired channels of a magnetic drum storage device, or into the desired locations in other types of storage devices. Means are provided to prevent the data items entered through the keyboard from controlling the operations of the selection unit. The instant invention includes a counter which is advanced one step for each digit key operation, and which serves to control the aligning of data being entered into the storage device, with a theoretical, fixed decimal point.

The invention also includes a precessing intermediate storage device wherein the several digits of each data item are assembled together for delivery, en-bloc, to the main storage device. The means of the invention also includes means to reset said counter to an initial count following operation of the keyboard to enter the said prefix digits into the storage location selector and before entering the data item associated therewith.

In one form of the invention, the prefix digits are assembled in the intermediate storage device prior to control of the storage location selector thereby. In a second form of the invention the prefix digits are not assembled in the intermediate storage device but are applied to the storage location selector directly from the keyboard.

Other objects and features of the invention will become apparent from the following description when read in the light of the attached drawings, of which:

In order to facilitate an understanding of the invention, the drawings have been simplified by the substitution of block symbols for certain circuits that are used repetitively, and Figs. 4 through 7 have been added to illustrate what the block symbols represent.

Figures 3, 4:
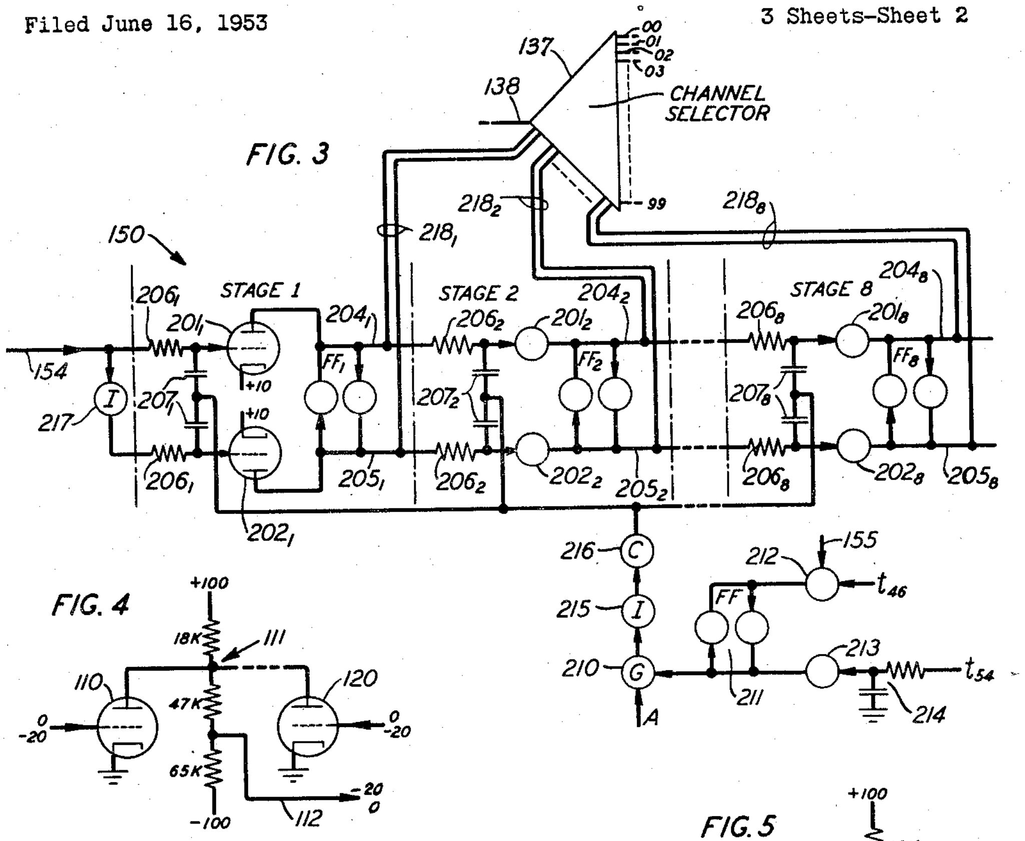
Fig. 3 is a schematic wiring diagram of the General Storage Control Circuit shown in block form in Fig. 1.
Figs. 4 through 7 are schematic wiring diagrams of several circuits which are shown symbolically in the other figures.

Referring to Fig. 4 there is illustrated an electronic inverter which in the other figures is represented by an encircled "I." As shown, the inverter consists of a triode 110 of suitable type having its cathode grounded and its anode applied to the juncture of the two positivemost sections of a three section voltage divider 111. Said voltage divider is connected across sources of +100 and −100 volt potentials and has an output line 112 projected from the center tap thereof. Utilizing the resistor values indicated in the drawings, the application of 0 volt potential to the grid of the triode to effect conduction of the latter causes output line 112 to assume a potential of approximately −20 volts. Application of a −20 volt potential to the grid of the triode, however, cuts off the latter and the potential of output line 112 rises to approximately 0 volts. In the illustrated embodiment of the invention, potentials of 0 volts and −20 volts are used throughout and, for convenience, will hereinafter be referred to as "high" and "low" respectively.

Figure 5:
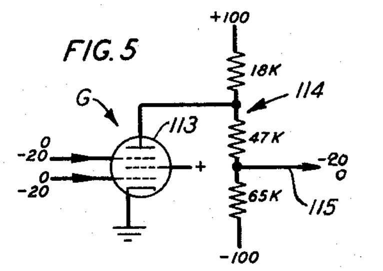

Referring to Fig. 5 there is illustrated a coincidence gate, or, as it is sometimes referred to, an And gate, which in other figures is represented by an encircled "G." As shown, the coincidence gate consists of a pentode 113 of suitable type having its anode connected to a three section voltage divider 114 of the type described above, and its cathode connected to ground. An output line 115 is projected from the center tap of the voltage divider and the screen grid of the pentode is connected to a source of positive potential in the normal manner. The control and suppressor grids of the pentode, however, are connected to signal sources which assume the high and low potential levels of 0 and −20 volts. Simultaneous application of high potentials to both grids of the pentode effects conduction thereof and output line 115 assumes a low potential (−20 volts). Application of a low potential to either or both grids of the pentode effects cutoff of the latter and output line 115 assumes a high potential (0 volts).

Figure 6:
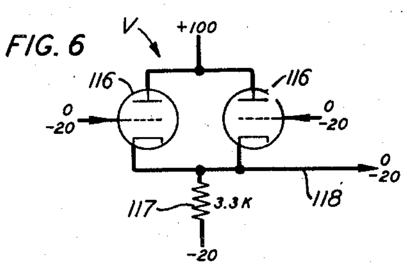

Referring now to Fig. 6, there is disclosed an Or gate which in the other figures is represented by an encircled "V." As shown, the Or gate consists of a pair of triodes 116 having their anodes commonly connected to a source of positive potential and their cathodes commonly connected through a resistor 117 to a source of negative potential, say −20 volts. An output line 118 is projected from the connected cathodes. Application of a low potential (−20 volts) to the grids of both triodes maintains both in cutoff condition and output line 118 assumes a potential of −20 volts. However, if a high potential (0 volts) is applied to the grid of either triode or to the grids of both, the potential of output line 118 is raised by cathode follower action to approximately 0 volts. Obviously, an Or gate may include any number of triodes connected with a common resistor 117 and output line 118.

Referring again to Fig. 4, another type of coincidence gate, hereinafter called a plate-connected coincidence gate, is formed by connecting the anode of another triode 120 to the voltage divider for triode 110. A high output is produced on line 112 only when low potentials are applied to the grids of both triodes concurrently. If desired, more than two triodes, or pentodes of the type used in the coincidence gate described above, or a combination of both, can be connected with a single voltage divider in this manner. In the other figures of drawing, a plate-connected coincidence gate is indicated by an encircled "$G_p$."

Figure 7:
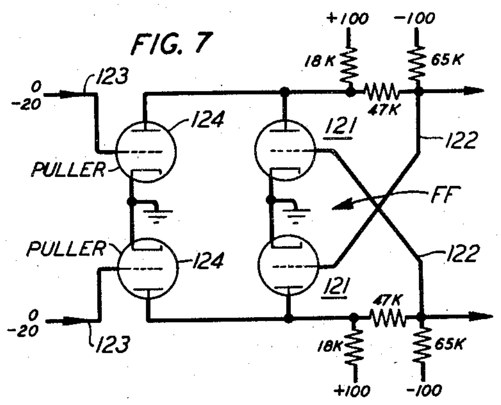

Referring now to Fig. 7, there is illustrated a bi-stable flip-flop which in the other figures of drawing is represented by a pair of circles and the letters "FF." As shown, the flip-flop consists of two inverters 121 of the type illustrated in Fig. 4, each having its output line 122 applied to the grid of the other. Evidently, conduction of one triode maintains the other non-conductive. Input lines 123 are provided to the grids of puller tubes 124, plate-to-plate connected each with one of the flip-flop triodes. The pullers illustrated in Fig. 7 are triodes but pentodes of the type utilized in the coincidence gate described above may be utilized if desired. Application of a high potential (0 volts) to the input line 123 of the puller associated with the non-conducting flip-flop tube effects conduction of the former and lowers the potential at its anode. Therefore, the potential of the output line 122 of the non-conducting flip-flop tube is lowered to the point where the conducting flip-flop tube is cut off, and the conductive states of the tubes reverse. Application of a low potential (−20 volts) to one of the input lines 123, or a high potential to the input line 123 associated with a conducting flip-flop tube, is ineffective is so far as changing the state of the flip-flop is concerned.

Referring to Fig. 6, a cathode follower, elsewhere indicated by an encircled "C," may comprise a single triode 116 connected as shown. Application of 0 and −20 volt signals to the grid of the triode causes the output line 118 thereof to assume potentials of approximately 0 and −20 volts respectively.

It is to be understood, of course, that the circuits described above are merely by way of example and are readily replaceable by other circuits which accomplish the same results. For example, the flip-flops, as used in the means of the invention, may be replaced by other bistable devices such as lockup relays so that the term "flip-flop" must be understood as including the same.

Before entering into a detailed description of the means of the invention, it is deemed desirable, first, to describe the environment and organization of said means and the modes of operation thereof.

Figure 1:
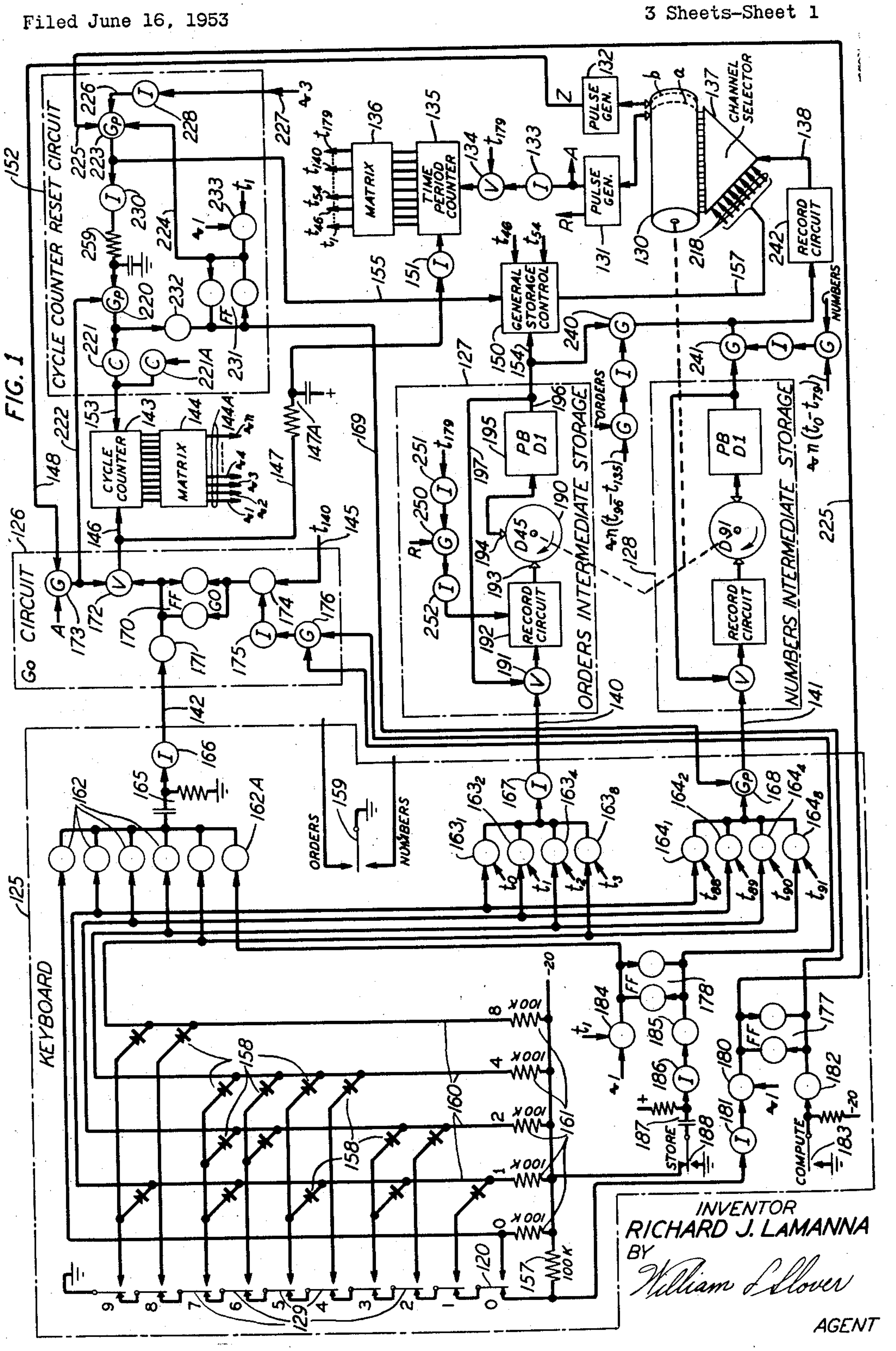
Fig. 1 is a schematic wiring diagram of the means of the invention.

In the illustrated instance of the invention the same is embodied in a computer of the type disclosed in the copending applications of William Burkhart et al., Serial No. 270,876, filed February 9, 1952, and Serial No. 298,526, filed July 12, 1952. Referring to Fig. 1, said computer is provided with a magnetic storage drum 130 which embodies a multiplicity of peripheral channels, for example, one hundred, each of which cooperates with an individual record-playback head. A channel selector 137, which may comprise a relay pyramid of the type shown in Patent No. 2,628,277, serves to connect the record-playback heads for the several channels with a single record circuit 242, selectively. Record Circuit 242 may take the form disclosed in Patent No. 2,633,564 to H. M. Fleming, Jr. A playback circuit is also provided for connection with said heads but as it is not necessary to a disclosure of the invention, it is not shown.

Each channel of the drum is divided lengthwise into one hundred eighty storage locations in each of which a binary one is recorded by magnetizing a spot therein with one polarity and a binary zero is recorded by magnetizing a spot therein with the opposite polarity.

A pair of timing channels, *a* and *b*, are provided on the drum 130, the former having a full complement of one hundred eighty spot recordings therein and the latter having a single spot recording therein. The playback means for tracks *a* and *b* actuate pulse generators 131 and 132 which produce the pulse trains A and R and the pulse train Z respectively (see Fig. 2). Pulse generators 131 and 132 may take the form shown in Patent No. 2,686,262 with the pulse generator 131 including a delay multivibrator to which A pulses are fed to obtain R pulses. Each A pulse effects initiation of a time period $t_0, t_1, t_2, \ldots t_{178}$ or $t_{179}$, during which one of the one hundred eighty storage locations in each channel cooperates with the associated recording-playback head. To this end the positively directed A pulses are transmitted from pulse generator 131 through an inverter 133 and an Or gate 134 to a time period counter 135 which is advanced one count to initiate each time period by each negative pulse from the inverter. Time period counter 135 is a binary counter having a capacity of two hundred fifty-six (0–255) but the same is arranged to count through only 180 steps ($t_0$–$t_{179}$). Time period counter 135 may take the form disclosed in Patent No. 2,604,263.

The several stages of counter 135 are connected to a matrix 136 to produce timing signals that identify the time periods and groups of time periods during which it is desired to effect timed operations. Matrix 136 may be of any sort, for example, a crystal diode matrix as disclosed on pages 17–19 of "High Speed Computing Devices" by the staff of ERA, 1950, published by McGraw-Hill Book Company. The output of matrix 136 which is high during time period $t_{179}$ (count 180) is applied to one of the inputs of Or gate 134 and prevents time period counter 135 from advancing beyond 179 in response to subsequent pulses from inverter 133. Means presently to be described are provided to jump counter 135 to capacity (255) and thus to permit a cycle of operation thereof each time a digit key 129 of a keyboard 125 which is used to enter data in the storage device, is operated.

Each keyboard digit key operation enables a Go circuit 126 for operation by the next following Z pulse which is applied to it over a line 148. In order to prevent a second operation of the Go circuit the same is disabled prior to the occurrence of the second Z pulse following the key operation by resetting a flip-flop therein as explained hereinafter. Each operation of the Go circuit produces a pulse which is transmitted over a line 146 to a cycle counter 143 which may be of the same type as time period counter 135 to advance the cycle counter 143 one count, and over a line 147 to an inverter 151 which serves to jump time period counter 135 to capacity to initiate a cycle of operation thereof. Evidently, therefore, the state of counter 143 indicates the number of digits which have been entered through the keyboard, or more conveniently, the number of cycles of operation which time period counter 135 has undergone. The several stages of cycle counter 143 are connected to a matrix 144 whose output lines 144A assume high potentials on the appropriate cycles and are used to control the operation of the invention.

Keyboard 125 is utilized to enter two kinds of digital data into the computer, namely, numbers to be utilized as factors in the arithmetic operations of the computer or in other similar ways and, orders (or commands) each consisting of a predetermined number of digits and each adapted to effect certain automatic operations of the computer, such, for example, as extracting a number from a particular drum channel. Hereinafter the two kinds of data will be referred to as Numbers and Orders.

The invention also includes Orders and Numbers Intermediate Storage Devices 127 and 128, respectively, which may be channels on drum 130 wherein the several digits of each Order and Number which are entered through the keyboard one by one, are assembled for transmission en bloc to a selected general storage channel at the appropriate time. A gate 240 serves to time the transmission of Orders to the record circuit 242 for the general storage drum and a gate 241 serves the same purpose in connection with Numbers. Both Orders and Numbers digits are recorded in each Intermediate Storage Device, but only the digits appropriate to each are transmitted therefrom to the General Storage Device, that is, only Orders digits are transmitted from the Orders Intermediate Storage Device and only Numbers digits are transmitted from the Numbers Intermediate Storage Device. To this end a manually operable switch 159 is provided to enable one of the gates 240 or 241 and to disable the other in the manner shown.

The Orders Intermediate Storage Device 127 has an output line 154 thereof applied to a General Storage Control Circuit 150 whose function it is to effect differential operations of the channel selection circuit 137. As will be described hereinafter, circuit 150 is controlled by the signal representations of a pair of digits which are applied thereto by the Orders Intermediate Storage Device at the appropriate time, and is effective to set the channel selecting pyramid 137 to connect the record circuit 242 with the record-playback head for the drum channel appropriate to the values of said pair of digits (0–99). Of course, if the number of channels exceeds one hundred, a third such digit may be provided or another system of notation, for example sexadecimal may be utilized.

According to the invention, each Order or Number to be entered through keyboard 125 is provided with a two digit prefix which identifies the channel of drum 130 in which the said Order or Number is to be stored. These prefix digits are entered through the keyboard prior to the digits of said Order or Number and are recorded in the Orders Intermediate Storage Device 127 which, at the appropriate time, transmits the signal representations thereof to General Storage Control Circuit 150 over line 154. The cycle counter, which advances two steps (to three) on entry of said prefix digits is reset to its initial count (one) by a reset circuit 152, following transmission of the representations of said digits to the control circuit 150. Thereafter the cycle counter advances one step for each digit of the said Order or Number as the same are entered through the keyboard, until, following the entry of the last digit thereof, a so-called Store key is operated to transmit the entire Order or Number to the General Storage device and to restore the counter to its initial count.

Referring to Fig. 1, the keyboard 125 is of the ten-key variety and, in addition to the digit keys 129, is provided with an Orders-Number switch 159, a Store key 188 and a Compute key 183 to end input operations and permit use of the storage device by the computer with which it is associated. Each digit key 129 includes a switch blade operable to engage a front contact but normally engaged with a rear contact. The blades and the rear contacts for the several keys form a series path between ground and a large resistor 157 connected to a source of negative potential, say −20 volts. The front contacts of the keys are connected through diodes 158 to one or more lines 160 having the values 1, 2, 4 and 8 in accordance with the binary-coded decimal system of notation. Each line 160 is connected through a large resistor 161 with the −20 volt source and normally is maintained at substantially the negative potential of the latter. However, when a digit key 129 is operated the switch blade thereof engages its front contact, and through the medium of the associated diode or diodes 158 connects the appropriate lines 160 to ground, which potential said lines assume.

Each line 160 is applied to a triode 162, an Orders, coincidence gate, type, pentode 163, and a Numbers, coincidence gate, type, pentode 164. Conveniently the reference character for each pentode 163 and 164 is provided with the same subscript 1, 2, 4 or 8 as the associated line 160. It is to be noted that the zero key 120, controls a triode 162, the same as the other keys, but that no pentode 163 or 164 is provided for cooperation therewith. The several triodes 162 are connected with a single voltage divider (not shown) to form a plate connected coincidence gate such as that described hereinabove. The common output of the triodes is applied to a differentiator 165 which, on conduction of one or more of the triodes in response to a digit key operation, delivers a single, sharp, negatively-directed pulse to a normally conductive inverter 166 to cut off the latter.

The Orders pentodes 163 are also connected with a single voltage divider (not shown) to form a plate connected coincidence gate and the Numbers pentodes 164 are arranged in the same fashion. These two gates serve as parallel to serial converters adapted to transform the digit representing potentials of the parallel lines 160 into time-spaced, serial pulses or potentials on a single line. To this end the pentodes $163_1$, $163_2$, $163_4$ and $163_8$ and the pentodes $164_1$, $164_2$, $164_4$ and $164_8$ are conditioned for conduction during time periods $t_0$, $t_1$, $t_2$ and $t_3$, and $t_{88}$, $t_{89}$, $t_{90}$ and $t_{91}$ respectively by the appropriate output lines of matrix 136. The common output of the pentodes 163 is applied to an inverter 167 which is cut off whenever one of the pentodes conducts in response to a digit key operation, and the common output of the pentodes 164 is applied to a plate connected coincidence gate 168 to produce a high output therefrom when one or more of the pentodes conducts in response to a digit key operation. The outputs of the inverter 167 and the gate 168 are transmitted over lines 140 and 141 to the Orders and Numbers Intermediate Storage Devices 127 and 128.

*The Go circuit*

Figure 2:
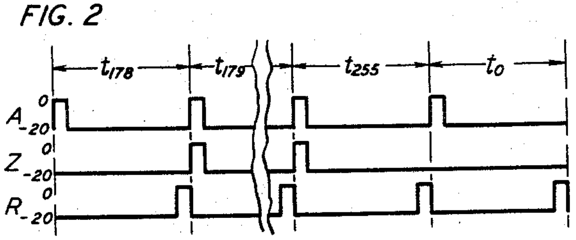
Fig. 2 is a pulse chart illustrating the relationships between the pulse trains which are utilized to control the means of the invention.

The central element of Go circuit 126 is a flip-flop 170 which is set in response to each digit key operation, by a triode puller 171 under control of the inverter 166, described above. The output of flip-flop 170 which is low when the same is set, is applied to an Or gate 172 along with the output of a coincidence gate 173 which conducts, and thus produces a low output, only when a Z pulse from generator 132 and an A pulse from generator 131 occur coincidentally. Referring to Fig. 2, it will be seen that the Z and A pulses occur coincidentally, only during the last time period of each cycle, that is, time period $t_{179}$ or $t_{255}$ as the case may be. The output of Or gate 172 is applied to cycle counter 143 which is advanced one step each time the same assumes a low potential, that is, when the outputs of gate 173 and flip-flop 170 are both low. The output of Or gate 172 is also applied via line 147 to the inverter 151 which is cut off to jump counter 135 to capacity (255) when the said output assumes a low potential. In order to prevent the same A pulse which effects jumping of counter 135 to capacity (255) from advancing the same another step to 0, an integrating or delay circuit 147A is interposed in line 147 to delay jumping of the counter to capacity until after the said A pulse has passed.

It is believed evident, that when the Go flip-flop 170 is set, cycle counter 143 is advanced one step and the time period counter 135 is jumped to capacity on the occurrence of the A pulse during the last time period of each cycle. However, when the flip-flop is in the reset state it maintains the output of Or gate 172 at a high potential which prevents advance of the cycle counter and prevents jumping of counter 135 to capacity. Therefore, counter 135 is advanced to 179 on the occurrence of the A pulse during the last time period of cycle and remains at said count until the flip-flop 170 is again set by puller 171.

Go flip-flop 170 is reset by a pentode (coincidence gate) puller 174 operable during the time period $t_{140}$ of each cycle by an inverter 175 which is maintained in condition to operate the puller, that is, cut off, all during keyboard digit entering operations. A coincidence gate 176 held conductive during this period by a pair of flip-flops 177 and 178, serves to so maintain the inverter 175.

Flip-flop 177 is set to apply a high potential to gate 176 by a pentode (coincidence gate) puller 180 which is operable during cycle one (initial count of counter 143) by an inverter 181. Said inverter is connected to the juncture of the resistor 157 with the series path through the keys 129 and thus is maintained conducting except when a key is operated to break the said path, at which time, the potential at said juncture drops to substantially −20 volts. Flip-flop 177 is reset to the opposite state by a puller 182 which is operated by the Compute key 183. Evidently, therefore, flip-flop 177 is set on operation of a first digit key 129 during cycle one, remains set all during keyboard digit entering operations, and is reset on operation of the Compute key 183.

Flip-flop 178 is set to apply a high potential to gate 176 by a pentode puller 184 which is operated during time period $t_1$ of cycle one by the appropriate outputs of the matrices 136 and 144. The flip-flop is reset by a triode puller 185 driven by an inverter 186 which is controlled by the Store key 188 through the medium of a differentiating circuit 187. The resistor of differentiator 187 is connected to a source of positive potential which normally maintains the inverter 186 conducting. The Store key 188 normally applies a negative potential to the condenser of the differentiator, but when operated connects the same to ground so that, on normalizing of the key, differentiator 187 delivers a sharp negatively directed pulse to inverter 186 to cut-off the latter and operate puller 185. Evidently, therefore, flip-flop 178 is set during time period $t_1$ of cycle one, remains set while the several digits of an Order or Number are entered through the keys 129 and is reset following operation of the Store key to transfer the said Order or Number from intermediate storage to the general storage drum.

In view of the above description of the modes of operation of the flip-flops 177 and 178, it will be seen that gate 176 permits operation of the Go flip-flop reset puller during time period $t_{140}$ of each cycle of a keyboard digit entering operation prior to operation of the Store key 188.

At this point it is to be mentioned that the output of flip-flop 178 which assumes a high potential when the same is reset under control of Store key 188 is applied to a triode 162A having its plate connected with those of the triodes 162. Therefore, on operation of the Store key 188, Go flip-flop 170 is set to effect advance of cycle counter 143, etc.

*Intermediate storage*

The Orders and Numbers Intermediate Storage Devices 127 and 128 each include a magnetic disc which is driven in synchronism with the drum 130, and, in effect, comprises a channel of the drum. Recording on the Orders disc which is labeled 190, is accomplished by a record circuit 192 which may be of the same type as record circuit 242 which drives a record head 193. Circuit 192 and head 193 records spots with one polarity to represent binary one and with the opposite polarity to represent binary zero. Recorded data is played back by a playback head 194 which drives a play-back circuit 195 which may take the form disclosed in Patent No 2,633,564 to H. M. Fleming, Jr. The output of playback circuit 195 is coupled back to the input of record circuit 192 over a line 197 and through an Or gate 191 which is also controlled by the inverter 167 described above. Preferably line 197 includes gating means for breaking the feed back loop at appropriate times as described in the aforementioned copending application Serial No. 298,526. For simplicity, however, said means are not illustrated nor will they be described further. The record and play-back heads 193 and 194 are spaced apart 90° to afford a 45 time period delay between the recording of a magnetized spot by the former and the playing back thereof by the latter, and, as described in the last-mentioned copending application playback circuit 195 affords a further delay of one time period which ups the total delay in the system to 46 time periods.

Therefore, a digit recorded on the disc during time periods $t_0$–$t_3$ of a cycle, in response to operation of one or more pentodes 163, is rerecorded 46 time periods later during time periods $t_{46}$–$t_{49}$, again during time periods $t_{92}$–$t_{95}$, still again during time periods $t_{138}$–$t_{141}$ of the same cycle, and then, on the next following cycle, during time periods $t_4$–$t_7$ immediately following the initial recording of another digit during time periods $t_0$–$t_3$. This shifting process is referred to as a precession and is more fully described in the aforementioned copending applications. The Numbers Intermediate Storage Device operates in the same manner except that the total delay in that system is 92 time periods.

The operations of Record circuit 192 are accurately timed by the R pulses from generator 131 which are used to enable the same, and, in order to precess recorded digits only four time periods between successive digit recordings, said R pulses are applied to a coincidence gate 250 along with the output of an inverter 251 which conducts during time period $t_{179}$. Remembering that the outputs of matrix 136 indicate time period $t_{179}$ all during keyboard operations except for the cycle following each digit key operation, it will be seen that the R pulses are effective to control gate 250 only during the said cycle following each digit key operation. The output of gate 250 is applied to an inverter 252 which applies to gated R pulses to Record circuit 192 to effect a single cycle of operation thereof following each digit key operation. Preferably the output of inverter 252 is applied to coincidence means along with the output of gate 191 to effect recording of binary one when both outputs are high and binary zero when the former is high and the latter is low. Said means form no part of the invention, however, and will not be described herein.

In view of the above, it will be seen that when the two prefix digits applied to a Number or Order are entered through keyboard 125, they are recorded on disc 190, the first, during time periods $t_0$–$t_3$ of cycle two and the second during time pertiods $t_0$–$t_3$ of cycle three. It will also be seen that due to the precessing nature of the Orders Intermediate Storage Device, playback circuit 195 transmits signal representations of said digits over line 154 during time periods $t_{46}$–$t_{53}$ of cycle three. Line 154, it will be remembered, is applied to the General Storage Control circuit 150 which controls the channel selecting relay pyramid 137.

*General storage control*

Referring to Figs. 1 and 3, the central element of the General Storage Control circuit 150, is an eight stage shift register which may be of the type disclosed in the patent to William Burkhart No. 2,601,089.

This shift register comprises a series of eight flip-flops $FF_1$, $FF_2$, $FF_3$ . . . $FF_8$ each controlled by normally cut off puller triodes 201 and 202 whose cathodes are connected to a source of +10 volts potential. The output lines 204 and 205 of each flip-flop are connected to the grids of the pullers 201 and 202 for the next flip-flop of the series through the resistors 206 of integrating or delay circuits which also include a condenser 207 to which the A pulses from generator 131 (see also Fig. 2) are applied through suitable gating to be described hereinafter. Integrators 206, 207 also connect the pullers 201 and 202 for the initial stage of the shift register with the input line 154, one such connection being through an inverter 217 in the usual manner. The time constant of each integrator 206, 207 is large with respect to the duration of an A pulse so that a change in the state of a flip-flop $FF_1$, $FF_2$ . . . $FF_7$ or of the input line 154 during the span of an A pulse does not effect a change in potential at the grids of the pullers for the succeeding flip-flops until after the termination of the A pulse. In short, during each A pulse, the potential level (0 or −20 volts) at the grid of each puller 201 and 202, is that appropriate to the state which the preceding flip-flop or the input line 154 was in prior to the occurrence of the A pulse. On application of an A pulse to the several condensers 207 the potential level of the grid of one puller of each pair 201 and 202 is raised from approximately −20 volts to zero volts while the potential level of the grid of the other puller of the pair is raised from approximately zero volts to +10 volts. The former puller remains in the cut off state, but the latter puller conducts, and pulls the associated flip-flop to the appropriate state, if the same is not already in that state.

Evidently, therefore, as line 154 assumes high and low potentials (0 and −20 volts) during time periods $t_{46}$–$t_{53}$ of cycle three, to represent the eight successive binary digits of the two prefix digits which serve to select the channel of drum 130 in which a Number or Order is to be stored, the flip-flop $FF_1$ in the initial stage of the shift register is set and reset to represent said digits. Further, it will be seen that as flip-flop $FF_1$ is set to represent each binary digit after the first, the preceding setting thereof is transferred to the flip-flop $FF_2$ in the second stage, etc., until finally all eight binary digits are set up in the shift register.

In order to control the channel selecting pyramid 137 differentially, in accordance with the digits represented by the settings of the several stages of the General Storage Control Shift Register, the output lines 204 and 205 of each stage thereof are applied via leads 218, to amplifiers or other means for effecting energization of the relays of said pyramid. The said relays and the amplifiers for operating the same may be arranged in accordance with any of a number of techniques well known in the art, and, therefore, the same are not shown and will not be described except to state that differential operation of the relays serves to connect the pyramid input line 138 from record circuit 242, with any one of 100 output lines 0–99 leading to the record-playback heads for drum 130.

In order to prevent the entry into the General Storage Control Shift Register of anything other than the representation of the channel selecting prefix digits which are applied to line 154 during time periods $t_{46}$–$t_{53}$ of cycle three for entry into the shift register through the initial stage integrators 206, 207 during time periods $t_{47}$–$t_{54}$ of that cycle, means are provided to block application of the A pulses to the shift register except during time periods $t_{47}$–$t_{54}$ of said cycle three. The A pulses are applied to the shift register through the media of a coincidence gate 210, an inverter 215 controlled by said gate and a cathode follower 216 which is driven by said inverter and is connected to the condensers 207 in the several stages of the shift register. Gate 210 is also controlled by a flip-flop 211 which is set to apply a high potential to the gate by a pentode puller 212 and which is reset to apply a low potential to the gate by a triode puller 213. One input to puller 212 is an output of matrix 136 that is high during time period $t_{46}$ and the other is a line 155 (see also Fig. 1) which, as will be fully described hereinafter, assumes a high potential only when cycle counter 143 attains a count of three in response to the entry of a pair of prefix channel selecting digits through keyboard 125. Triode puller 213 is controlled by an output of matrix 136 that is high during time period $t_{54}$ but which is applied to the puller through an integrator or delay circuit 214 to delay operation of the puller until after the A pulse has occurred during time period $t_{54}$.

Therefore flip-flop 211 is set in time to permit application of A pulses to the shift register during time periods $t_{47}$ et seq. of cycle three, to effect entry of a pair of prefix channel selecting digits into the shift register, and is reset to prevent application of further A pulses to the shift register, after the A pulse which occurs during time period $t_{54}$.

It is to be mentioned that, if desired, the shift register of the General Storage Control Circuit may be replaced by other suitable means, for example, a series of flip-flops having differentially timed pullers to which the digital signals are applied in common, such as disclosed in the copending application J. T. McCarrol, Jr. et al. No. 255,712 filed November 9, 1951.

*Cycle counter reset circuit*

In order to reset cycle counter 143 to its initial one count each time it is advanced to a count of three in response to the entry of a pair of prefix channel selecting digits through keyboard 125, and yet to permit of said counter advancing beyond a count of three when entering the digits of a Number or Order, or when a computation is being performed, the following means are provided. A cathode follower 221 (Fig. 1) controlled by a plate connected coincidence gate 220, is connected with cycle counter 143 in known manner to reset the same to its initial one count whenever the gate produces a high output. One input to gate 220 stems from the gate 173 which, as described above, conducts only when the A and Z pulses occur coincidentally during the last time period of each cycle. The other input to gate 220 stems from an integrator or delay circuit 259 which is under control of an inverter 230 driven by a plate connected coincidence gate 223 having three inputs 224, 225 and 226. Input 226 is produced by an inverter 228 which conducts during cycle three. Input 225 stems from the flip-flop 177 and is low all during keyboard operations and until the Compute Key 183 is operated. Input 224 is produced by a flip-flop 231 which is set to maintain the said input low, by a pentode puller 233 operated during time period $t_1$ of cycle one. Flip-flop 231 is reset to maintain said input high, by a triode puller 232 which is controlled by the output of gate 220.

At this point it is deemed desirable to point out that a time period $t_1$ of cycle one occurs only when the cycle counter 143 is reset to its initial one count while the Go flip-flop is set in that state in which it effects jumping of time period counter 135 to capacity. This state of affairs exists only during a "store" operation initiated by the Store key 188.

As described hereinabove, Store key 188 effects resetting of flip-flop 178 which applies a low potential to gate 176 to disable the means for resetting Go flip-flop 170 while at the same time, the output of flip-flop 178 which assumes a high potential when the same is reset is applied to triode 162A which, via differentiator 165, inverter 166 and puller 171, sets Go flip-flop 170 to effect advance of cycle counter 143 and jumping of time period counter 135 to capacity. Thereafter the system runs cyclically automatically in synchronism with the storage device until a predetermined cycle *n* when matrix 144 effects production of the cycle *n* signal. The cycle *n* signal together with the timing signals from matrix 136 causes operation of either gate 240 or gate 241 according to which of them is rendered operative by orders-numbers switch 159 to pass the contents of the intermediate storage 127 or 128, respectively, to record circuit 252 at the appropriate time during the cycle. The output of record circuit 242 is recorded on the selected channel of drum 130 via channel selection circuit 137. The cycle counter 143 may be reset to its initial one count via a cathode follower 221A whose output is combined with that of the cathode follower 221 described above and which would be timed, in suitable fashion, to operate at A pulse time of the last time period of the cycle, the same as the latter. Coincidentally with the resetting of cycle counter 143, a pulse is transmitted over line 147 to jump the time period counter 135 to capacity and thus to initiate a cycle of operation thereof. On advance of the counter to a count of one the output of matrix 136 appropriate to time period $t_1$ assumes a high potential and effects an operation of the puller 184 which sets flip-flop 178, thereby enabling the Go flip-flop resetting means for operation during time period $t_{140}$. After the Go flip-flop has been reset during time period $t_{140}$, counter 135 advances to a count of 179 at which point it is stopped as described above. Thereafter the counter 135 is enabled for a single cycle of operation, and cycle counter 143 is advanced one step, in connection with the entry of each of a pair of prefix channel selecting digits through keyboard 125. On advance of cycle counter 143 to a count of three in conjunction with the entry of the second of said prefix digits, inverter 228 conducts and applies a low potential to gate 223. Flip-flop 231, which was set during time period $t_1$ of cycle one also applies a low potential to said gate as does the flip-flop 177. Therefore, gate 223 applies a high potential to puller 212 (Fig. 3) to effect entry of the said prefix digits into the General Storage Control shift register at the appropriate time (time period $t_{47}$–$t_{54}$) as described hereinabove, and also to the inverter 230 (Fig. 1) which effects production of a high output from gate 220 during A pulse time of the last time period of cycle three, which is time period $t_{179}$ due to the reset state of Go flip-flop 170. The high output of gate 220 operates cathode follower 221 to reset cycle counter 143 to its initial one count and operates puller 232 to reset flip-flop 231 which thereafter applies a high potential to gate 223 to prevent another resetting of the cycle counter by cathode follower 221 until after the Store key has been operated again. Thus, the cycle counter is not reset when the same is advanced to a count of three in response to the entry through the keyboard of the digits of the Order or Number associated with the said prefix digits. It is to be noted that when the cycle counter 143 is reset to its initial one count by cathode follower 221 no time period $t_1$ occurs, but rather time period counter 135, which at that time stands at a count of 179, remains at said count until a digit key 125 is operated and the same is jumped to capacity (255) and the cycle counter 143 is advanced to a count of two.

It is to be mentioned that the output of flip-flop 231 which is high while the same is set to effect resetting of cycle counter 143 at the termination of cycle three as described above, is supplied to the gate 168 to prevent recording of prefix digits in the Numbers Intermediate Storage Device 128. Thus, said prefix digits are only recorded in the Orders Intermediate Storage Device. The reason for this is to eliminate the possibility that prefix digit recordings might be precessed into time positions in which they appear to be digits of a later recorded Number that, as entered through the keyboard, includes fewer digits than the computer is capable of handling.

Figure 8:
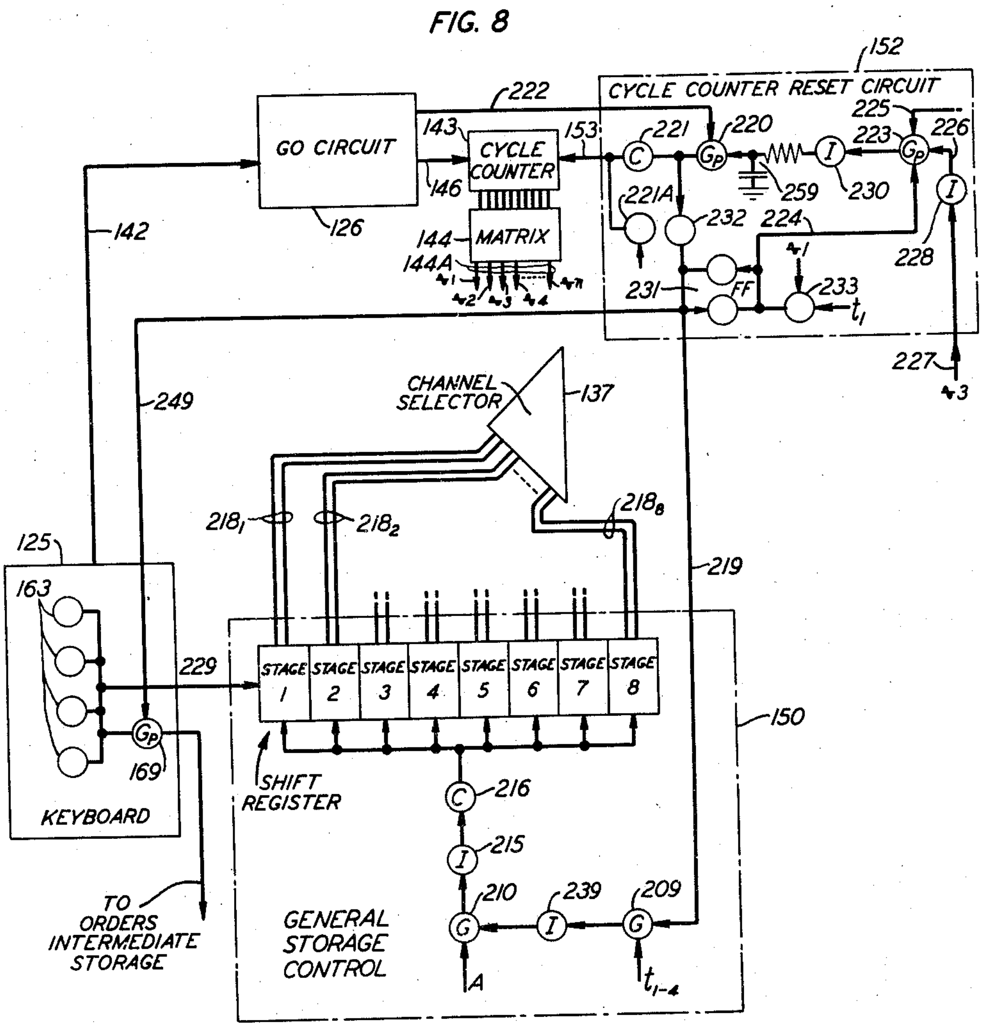
Fig. 8 is a fragmentary wiring diagram illustrating a modification of the means of Fig. 1.

Referring now to Fig. 8, there is illustrated a modified form of the invention wherein the channel selecting prefix digits associated with an Order or Number are not entered into the Orders Intermediate Storage Device, but rather, are entered directly into the General Storage Control Shift Register. For simplicity, only those portions of the circuit of Fig. 1 which are necessary to an understanding of the modified means are included in Fig. 8 wherein they are given the same reference numerals. In the circuit of Fig. 8, a plate connected coincidence gate 169 is used to connect the plate connected pentodes 163 with the Orders Intermediate Storage Device 127 instead of the inverter 167 used in the arrangement of Fig. 1. Gate 169 is controlled by flip-flop 231 in the same manner as the gate 168 of Fig. 1, that is, a high potential is applied thereto over a line 249 while the channel selecting prefix digits associated with an Order or Number are being entered through the keyboard, in order to block recording of said digits in the Orders Intermediate Storage Device. However, the plate connected pentodes are connected via a line 229 which replaces the line 154 of Fig. 1, with the initial stage of the General Storage Control Shift Register to enter the said prefix digits thereinto.

The prefix digits entered through the keyboard effect differential operation of the pentodes 163 during time periods $t_0$–$t_3$ of each of cycles two and three. Therefore means are provided to effect application of A pulses to the shift register during time periods $t_1$–$t_4$ of each said cycle and thereby to effect entry into the shift register of the four binary representations by said pentodes for each digit applied to the initial stage integrators of the shift register. During time periods $t_1$–$t_4$ of cycle two the representations of one of said digits are entered into the first four stages of the shift register and during time periods $t_1$–$t_4$ of cycle three, the representations in the first four stages are shifted to the last four stages while the representations of the second digit are entered into the first four stages.

The means for effecting application to the shift register during time periods $t_1$–$t_4$ of each of the prefix digit entering cycles two and three include (Fig. 8) the gate 210 to which the A pulses are applied, the inverter 215 and the cathode follower 216, all as in the arrangement of Fig. 3. However, the flip-flop 211 of Fig. 3 and the pullers therefor are replaced by a gate 209 which drives an inverter 239 whose output is applied to the gate 210. Gate 209 has an output of matrix 136 (Fig. 1) which is high during time periods $t_1$–$t_4$ applied to one input thereof while the other input is connected via a line 219 with that output of flip-flop 231 that is high during prefix digit entering cycles two and three. Evidently, therefore, gate 210 permits application of the A pulses to the shift register at the appropriate times, namely during time periods $t_1$–$t_4$ of prefix digit entering cycles two and three.

In other respects the modified form of the invention illustrated in Fig. 8 is the same as described above in connection with the arrangement of Figs. 1 and 3.

It is to be mentioned that the modified form of the invention shown in Fig. 8 is well adapted for use with storage devices which do not include an intermediate storage device and wherein data is entered directly into the main storage medium. It is also to be mentioned that, whereas the invention is described in connection with a keyboard input, the said input may be from magnetic or perforated tape or from punched cards or any other type of serial input device.

While there have been above described but a limited number of embodiments of the invention, it will be understood that many changes and modifications may be made therein without departing from the spirit of the invention and it is not desired, therefore, to limit the scope of the invention except as set forth in the appended claims or as dictated by the prior art.

I claim:

1. A system for entering a series of digits in serial coded form in a selected channel of a multi-channel, cyclically operating storage device comprising, channel selecting means, normally disabled timing means cyclically operated in synchronism with said storage device, input means for presenting digits, one digit at a time, intermediate storage means controlled by said timing means for assembling digits sequentially and for presenting the contents thereof to said channel selecting means or to said storage device, means actuated when a digit is present at said input means for enabling said timing means for one cycle of operation, means controlled by said timing means for entering a digit from said input means to said intermediate storage means, counting means for counting the number of cycles of operation of said timing means, control means initially set for effecting the presentation of the contents of said intermediate storage means to said channel selection means, and means for resetting said control means when said counter has reached a predetermined count for effecting the presentation of the contents of said intermediate storage means to said storage device, whereby the digits first presented by said input means select the channel of said storage device into which the digits later presented by said input means are entered in sequence.

2. A system according to claim 1 wherein said intermediate storage means includes a cyclically operating storage means operating in synchronism witih said storage device for assembling digits to be stored in said storage device and a multi-stage shift register settable to represent said channel selecting digits, and said control means includes a flip-flop, a first gating means for blocking the input to said intermediate storage cyclically operating storage means when said flip-flop is in a set state and a second gating means for blocking the input to said shift register when said flip-flop is in a reset state.

3. A system according to claim 2 further including gating means rendered operative when said counter has reached a second predetermined count for transferring the contents of said intermediate storage cyclically operating storage means to said storage device.

4. A system according to claim 2 including means for setting said control means when said counter has reached a third predetermined count.

5. A system according to claim 1 including means for setting said control means following the presentation of the contents of said intermediate storage means to said storage device.

6. A system according to claim 1 wherein said intermediate storage means includes a multi-stage shift register settable to represent said channel selecting digits having biasing means effective to prevent setting of the shift register stages and means for overcoming the effect of said biasing means rendered operable by said control means in a set state.

7. A system according to claim 1 further including gating means rendered operative when said counter has reached a second predetermined count for transferring the contents of said intermediate storage means to said storage device.

8. A system according to claim 7 including means for setting said control means following the presentation of the contents of said intermediate storage means to said storage device.

9. A system according to claim 1 wherein said control means in a reset state renders said channel selecting means non-responsive.

References Cited in the file of this patent

UNITED STATES PATENTS

| | | |
|---|---|---|
| 2,564,403 | May | Aug. 14, 1951 |
| 2,587,532 | Schmidt | Feb. 26, 1952 |
| 2,604,262 | Phelps et al. | July 22, 1952 |
| 2,611,813 | Sharpless et al. | Sept. 23, 1952 |

OTHER REFERENCES

Description of a Magnetic Drum Calculator: The Staff of the Harvard University Computation Laboratory, Harvard University Press. Copyright August 22, 1952. Copy available in Div. 23 (pages 19–31, 67–85, 142–159, 189–196 only).

Investigations for Design of Digital Calculating Machinery, Progress Report No. 2, Computation Lab., Harvard University, November 19, 1948; pages II–5 through II–9; copy in Div. 23.

Proceedings of Conference on Automatic Computing Machines, published by Commonwealth Scientific and Industrial Research Organization, Melbourne, Australia, April 1952, pages 163–171 and Figures 1–5 thereto, only.